(12) United States Patent
Kim et al.

(10) Patent No.: US 6,781,841 B2
(45) Date of Patent: Aug. 24, 2004

(54) ROTATABLE STORAGE SYSTEM FOR PERIPHERAL DEVICES

(75) Inventors: David K.J. Kim, San Jose, CA (US); William W. Ruckman, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/260,455

(22) Filed: Sep. 30, 2002

(65) Prior Publication Data

US 2003/0030992 A1 Feb. 13, 2003

Related U.S. Application Data

(63) Continuation-in-part of application No. 09/651,617, filed on Aug. 30, 2000, now Pat. No. 6,473,298.

(51) Int. Cl.$^7$ ................................................. H05K 5/03
(52) U.S. Cl. ........................................ 361/724; 361/685
(58) Field of Search ......................... 361/679, 683–686, 361/724–727

(56) References Cited

U.S. PATENT DOCUMENTS 5,995,364 A * 11/1999 McAnally et al. .......... 361/685
6,392,875 B1 * 5/2002 Erickson et al. ............ 361/683

* cited by examiner

Primary Examiner—Darren Schuberg
Assistant Examiner—Yean Hsi Chang
(74) Attorney, Agent, or Firm—Osha Novak & May L.L.P.

(57) ABSTRACT

The invention relates to an apparatus for storing electronic devices. In one embodiment, the apparatus comprises a base member attachable to an enclosure and a carrier rotatably coupled to the base member. The base member includes a pivotal member. The carrier includes a mounting mechanism coupled to the pivotal member to facilitate the rotational movement of the carrier with respect to the base member. The carrier is also adapted to attach to at least one peripheral device.

31 Claims, 8 Drawing Sheets

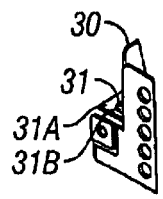
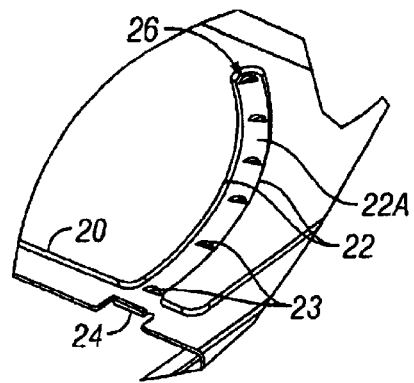
FIG. 8  FIG. 9
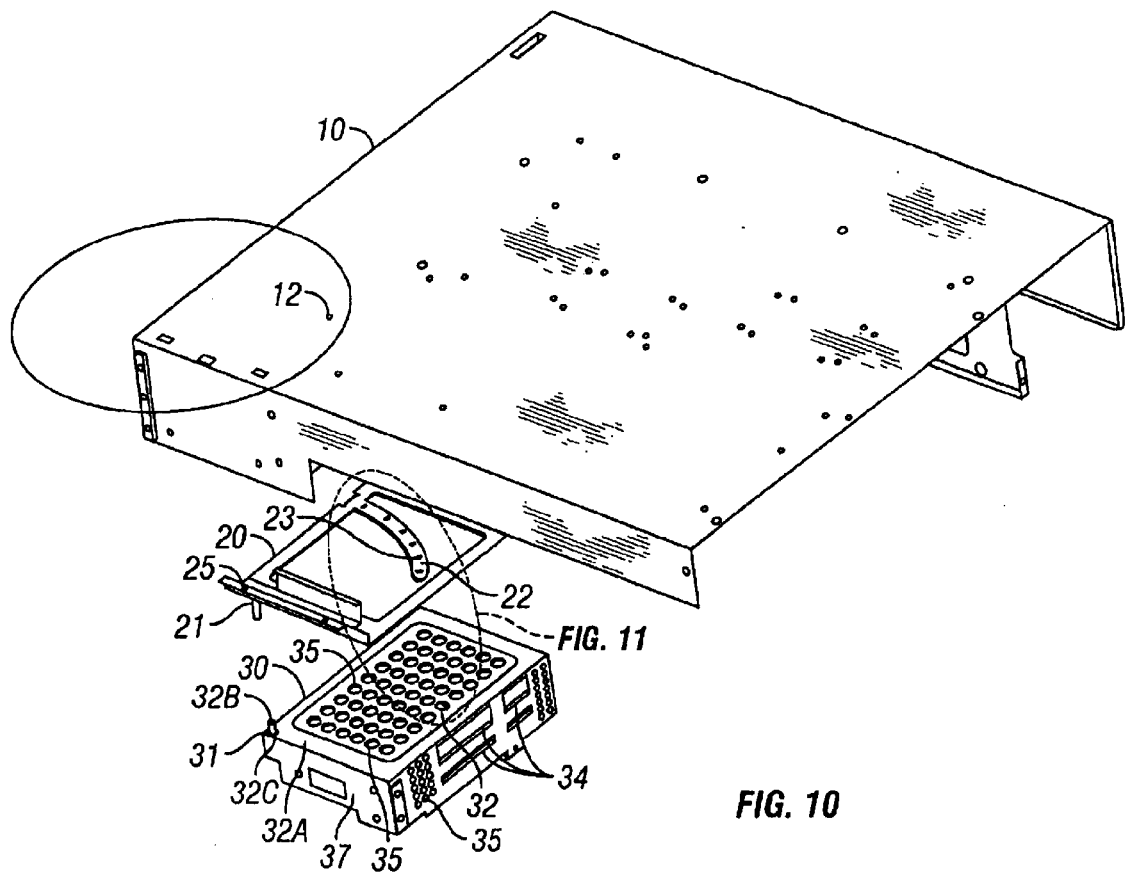
FIG. 10

ROTATABLE STORAGE SYSTEM FOR PERIPHERAL DEVICES

CROSS-REFERENCE TO RELATED APPLICATIONS

This application is a continuation-in-part of and claims the benefit under 35 U.S.C. §120 of U.S. application Ser. No. 09/651,617 filed Aug. 30, 2000 now U.S. Pat. No. 6,475,298 entitled "Peripheral Device Storage System," which is assigned to the assignee of the present invention.

BACKGROUND OF INVENTION

Conventional computer systems include a variety of components. For example, a computer system may include internal devices, such as a central processing unit ("CPU") for the processing of data, at least one bus for the transmission of data, and random access memory ("RAM") for the storage of data. Additionally, a typical computer system may include external, or peripheral devices, such as floppy disk drives or compact disk read-only memory (CD-ROM) drives.

A typical desktop or workstation PC may include, as an internal or an external component, a hard disk drive. Hard disk drives are typically high capacity storage devices that serve as the primary memory storage component of the computer system. Generally, in a PC, at least one hard disk is contained internally in a desktop or "tower" case.

Another type of computer system is a network system that includes the use of servers. There are several types of servers, including file servers that are typically dedicated to storing information, network servers that manage traffic on a computer network, and print servers that manage one or more printers. Server systems typically also include at least one hard disk drive for memory storage. However, some server systems may include a large number of external, or peripheral, hard disk drives, especially systems such as file servers that store large quantities of data. The physical configurations of these server systems poses a problem because of the large number of peripheral drives. The peripheral drives occupy large amounts of floor space and may create problems with the space availability in home and/or offices where the server systems are located.

In recent years, computer system manufacturers have taken steps to reduce the overall system space requirements for their products. Because of the desire for smaller systems, attempts have been made to increase the storage capacity of peripheral drives so that fewer drives are required. However, the storage capacity of peripheral devices is limited by current technology. Therefore, large numbers of peripheral devices are often required and are typically stored in peripheral enclosures that may occupy a considerable amount of floor space.

As an example, computer equipment may be mounted in racks as shown in prior art FIG. 1. The rack mounted computer equipment 1 may include hardware such as hard disk drives 2 that are accessible from a front 3 of a rack 4. The hard disk drives 2 are typically mounted with a long axis L1 of the hard disk drives 2 perpendicular to the front 3 of the rack 4. Another typical mounting configuration is shown in prior art FIG. 2. FIG. 2 shows an example of a typical solid-state hard disk drive 5 mounted in a conventional rack 6 where the hard drive 5 is attached so that a long axis L2 of the hard disk drive is perpendicular to a front 7 of the mounting rack 8.

Because of the desire for multiple peripheral devices in computer systems, the industry is in need of a compact apparatus for the storage of peripheral devices such as hard disk drives. The need will continue to grow as networking systems continue to increase in size.

SUMMARY OF INVENTION

In one aspect, the invention relates to an apparatus for storing electronic devices. In one embodiment, the apparatus comprises a base member attachable to an enclosure and a carrier rotatably coupled to the base member. The base member includes a pivotal member. The carrier includes a mounting mechanism coupled to the pivotal member to facilitate the rotational movement of the carrier with respect to the base member. The carrier is also adapted to attach to at least one peripheral device.

In one or more embodiments, the carrier may be rotated from an installed position to an open position. When in the installed position, a long axis of the carrier is substantially parallel to a front of the enclosure. When in the open position, the long axis of the carrier is substantially perpendicular to the front of the enclosure.

Other aspects and advantages of the invention will be apparent from the following description and the appended claims.

BRIEF DESCRIPTION OF DRAWINGS

FIG. 8 is an enlarged partial view of the pivotal member and the mounting mechanism shown in FIG. 7.

FIG. 9 is an enlarged partial view of the guide mechanism and the positioning mechanisms shown in FIG. 7.

FIG. 10 shows an exploded bottom perspective view of the embodiment of the invention shown in FIG. 3.

DETAILED DESCRIPTION

Figure 1:
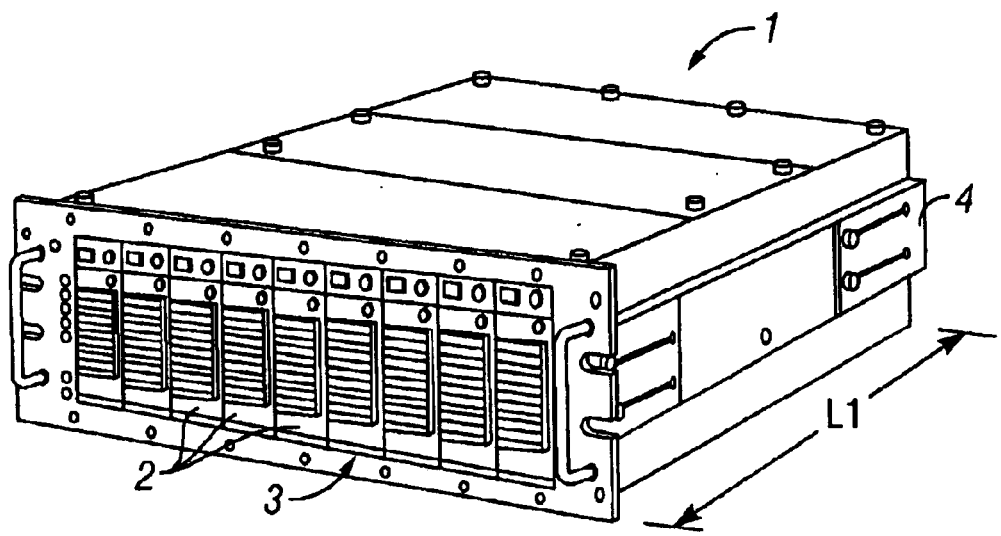
FIG. 1 shows an example of computer equipment mounted in a prior art peripheral storage rack.
Figure 2:
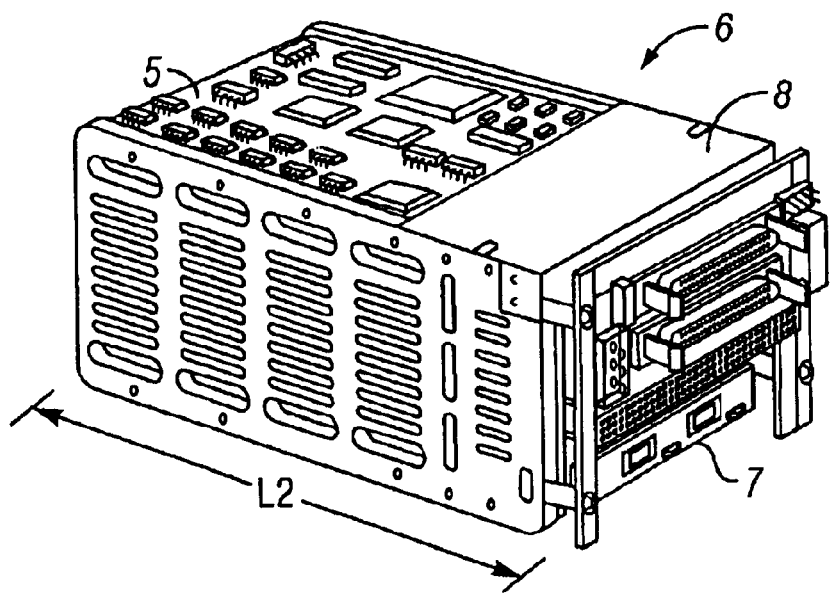
FIG. 2 shows an example of a prior art solid-state hard disk in a conventional storage rack.
Figure 3:
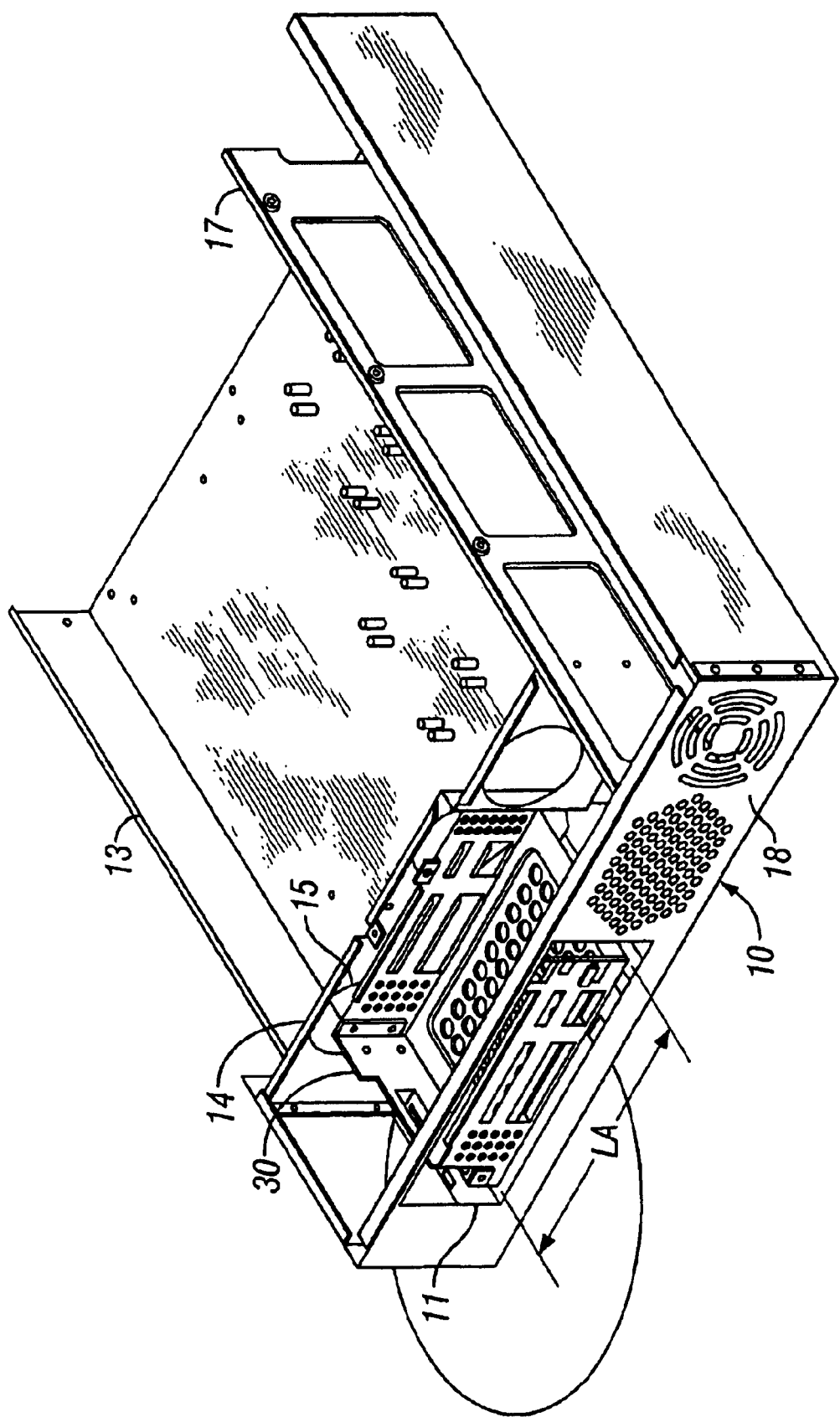
FIG. 3 shows a perspective view of an embodiment of the invention, wherein a rotatable storage system is in an installed position.
Figure 4:
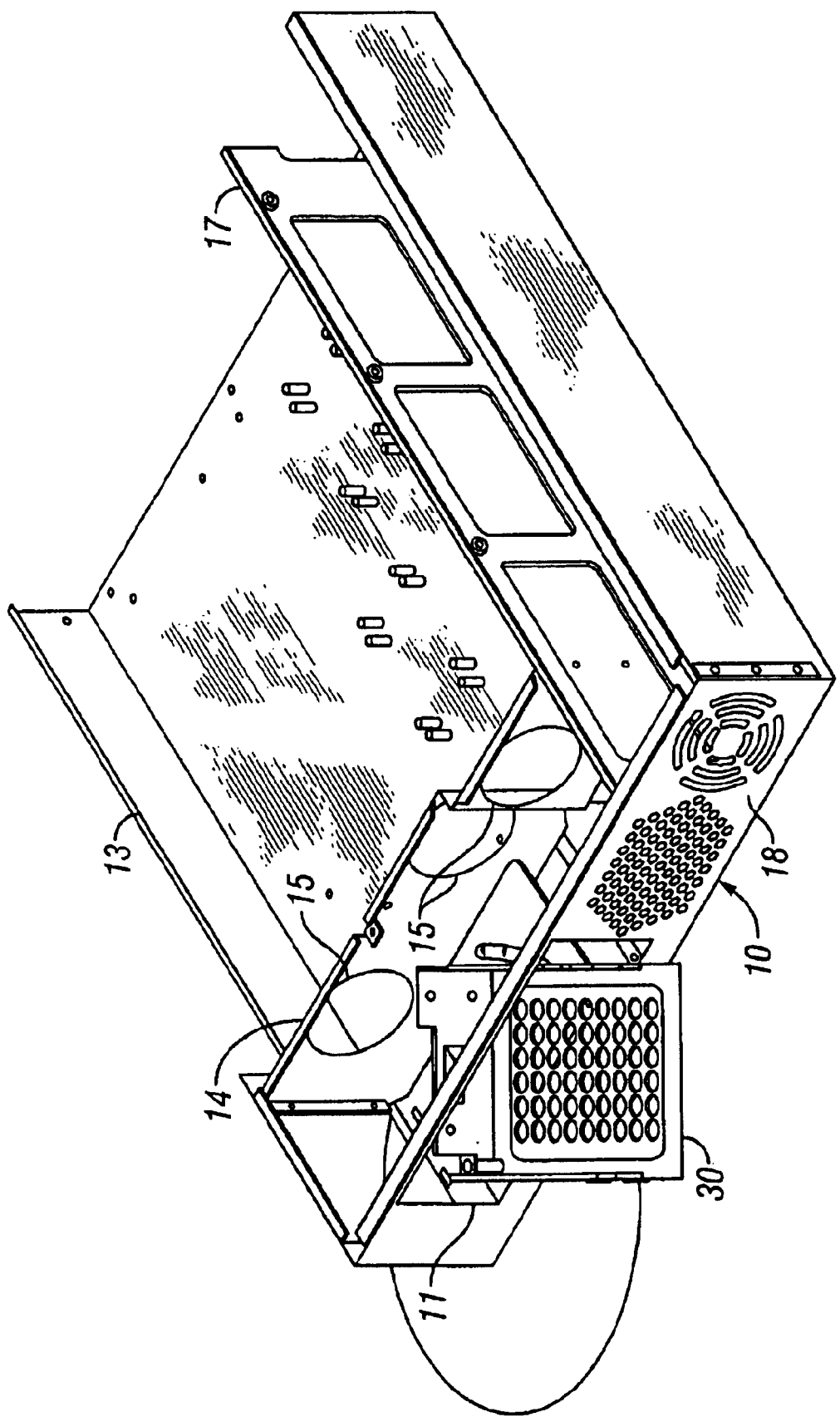
FIG. 4 shows a perspective view of an embodiment of the invention, wherein the rotatable storage system is in a partially opened position.
Figure 5:
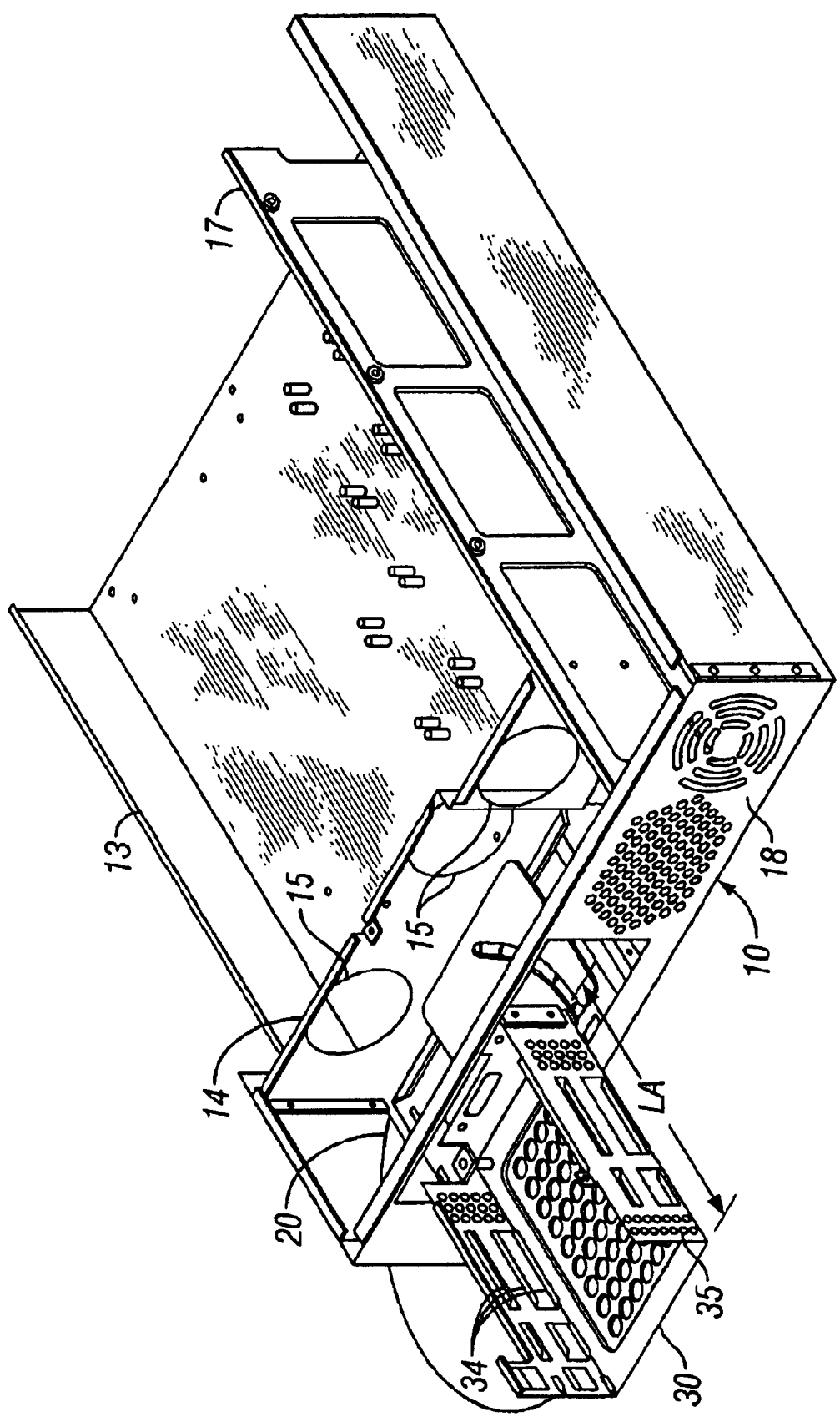
FIG. 5 shows a perspective view of an embodiment of the invention, wherein the rotatable storage system is in a completely open position.
Figure 6:
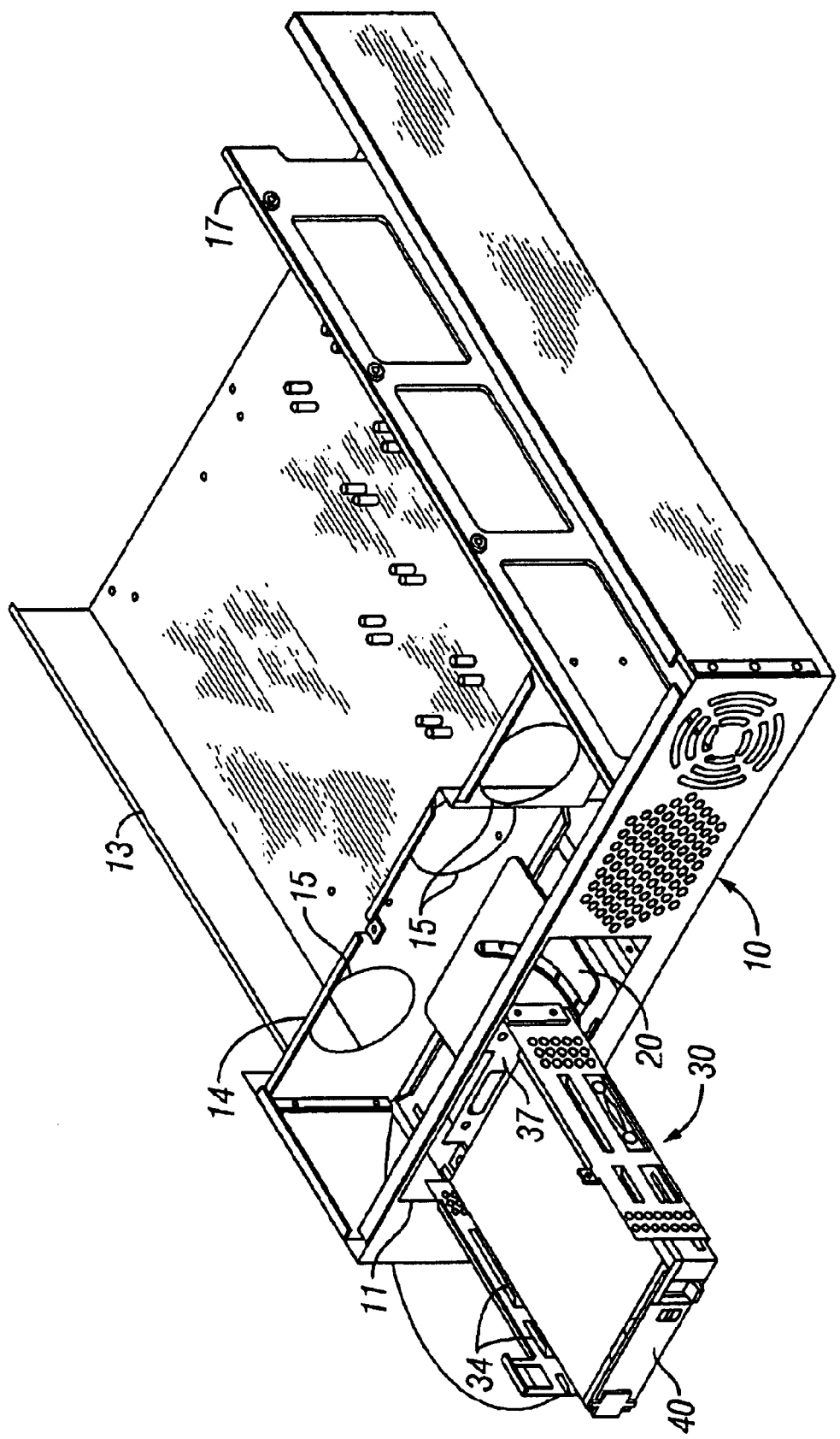
FIG. 6 shows a perspective view of the embodiment of the invention shown in FIG. 5, wherein a peripheral device is disposed within the rotatable storage system.

A perspective view of an exemplary embodiment of the invention is shown in FIGS. 3–6. FIG. 3 shows a rotational storage system in an installed position with respect to an electronic system enclosure 10. FIG. 4 shows the rotational storage system in a partially opened position with respect to the electronic system enclosure 10. FIG. 5 shows the rotational storage system in an open position with respect to the electronic system enclosure 10. FIG. 6 shows the rotational storage system of FIG. 5 having a peripheral device disposed therein. Exploded views of the exemplary embodiment are shown in FIGS. 7–13.

Figure 7:
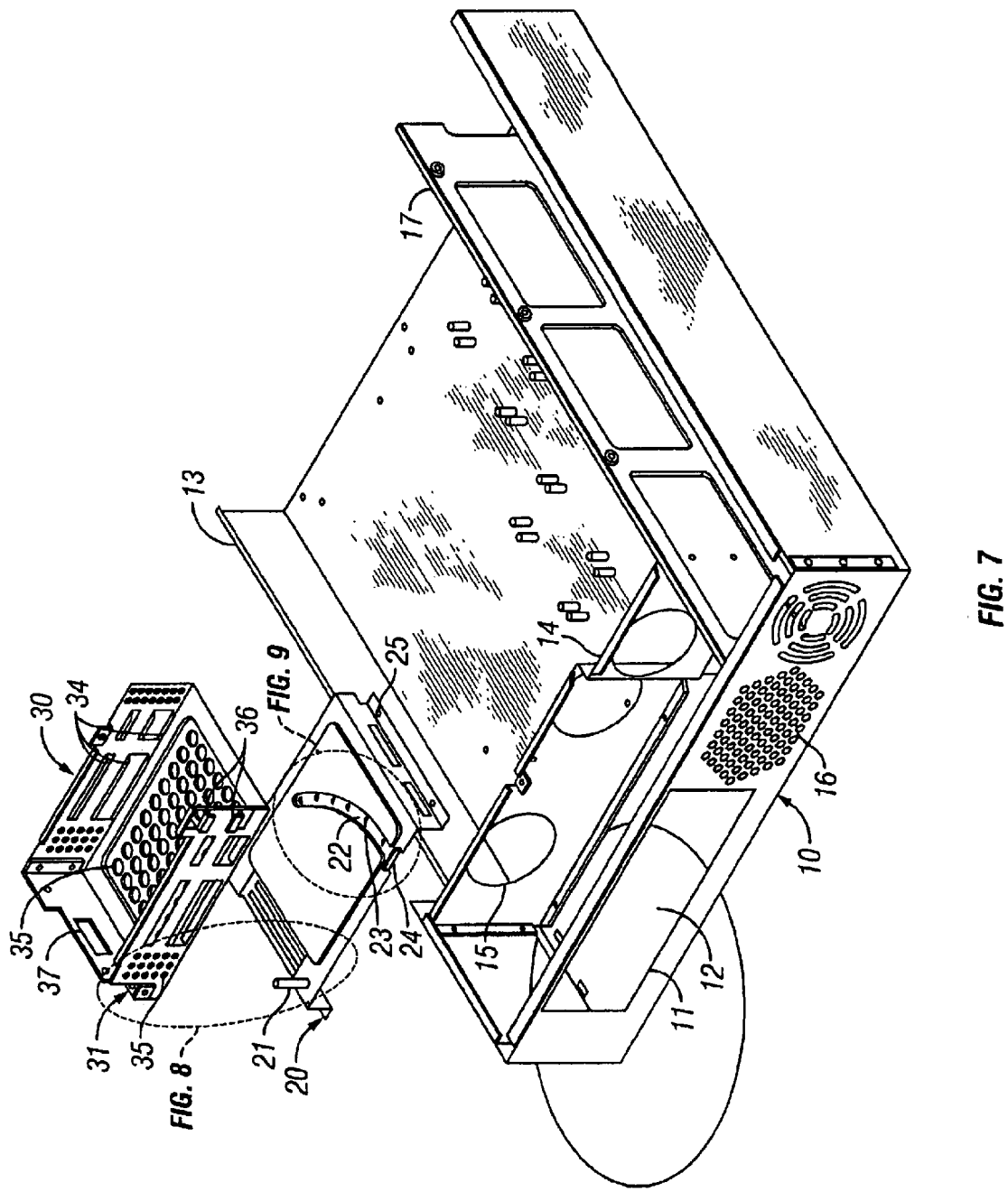
FIG. 7 shows an exploded top perspective view of the embodiment of the invention shown in FIG. 3.
Figure 11:
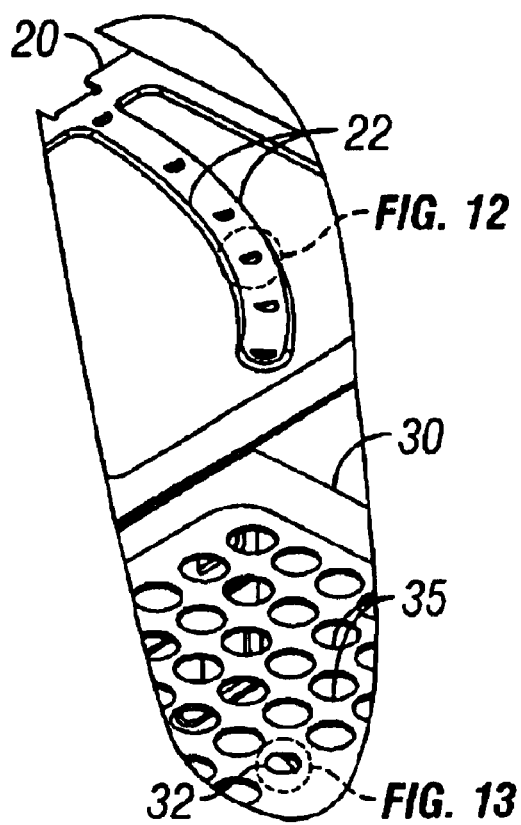
FIG. 11 is an enlarged partial view of the carrier and the base member shown in FIG. 10.
Figure 12:
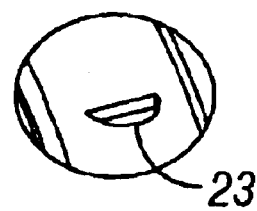
FIG. 12 is an enlarged partial view of the positioning mechanism of the base member shown in FIG. 11.

Referring primarily to FIG. 7, the rotatable storage system comprises a base member 20 and a carrier 30. The base member 20 is adapted to attach to an electronic system enclosure 10. The carrier 30 is adapted to rotatably couple to the base member 20. The base member 20 may be attached to the electronic system enclosure 10 by any attachment means known in the art. For example, the base member 20 may be mechanically fastened to the electronic system enclosure 10 by a standard riveting process or by inserting screws in holes 25 disposed on the base member 20. In preferred embodiments, the base member 20 is arranged proximal an opening 11 of the electronic system enclosure 10 such that the carrier 30 is rotatable in and out of the electronic system enclosure 10 when the carrier 30 is coupled to the base member 20. In the embodiment shown, the base member 20 comprises a base plate.

The base member 20 includes a pivotal member 21. The pivotal member 21 couples to the carrier 30. The pivotal member 21 is adapted to facilitate rotational movement of the carrier 30 with respect to the base member 20. The pivotal member 21 provides a pivot about which the carrier 30 rotates with respect to the base member 20. In the exemplary embodiment shown, the pivotal member 21 comprises a cylindrical body that extends in a substantially perpendicular direction from a surface of the base member 20. This example of a pivotal member 21 is shown in further detail in FIG. 8. In other embodiments, the pivotal member 21 may be any device or mechanism, which enables rotational coupling of the carrier 30 to the base member 20.

Referring back to FIG. 7, the carrier 30 includes a mounting mechanism 31 that rotatably couples to the pivotal member 21. The coupling between the mounting mechanism 31 and the pivotal member 21 permits the rotational movement of the carrier 30 from an installed position (shown in FIG. 3) to an open position (shown in FIG. 5). The mounting mechanism 31 is shown in further detail in FIGS. 8 and 10.

In one or more embodiments, the mounting mechanism 31 comprises a plurality of plates (31A in FIG. 8, 32A in FIG. 10). In the embodiment shown, the plates are axially spaced apart and substantially parallel to each other. Each plate has an opening (31B in FIG. 8, 32B in FIG. 10) disposed thereon. The openings (31B in FIG. 8, 32B in FIG. 10) are co-axially aligned with respect to each other. This alignment permits the pivotal member 21 to be inserted in the openings when the carrier 30 is mounted on the base member 20.

Referring to FIG. 10, a first plate 32A is formed continuous with the bottom 38 of the carrier 30. The opening 32B in the first plate 32A comprises a cylindrical hole. The first plate 32A also comprises a cylindrical rib 32C. The cylindrical rib is disposed on a bottom surface of the first plate 32A around the opening 32B. The cylindrical rib 32C may, advantageously, help to stabilize the rotational movement of the carrier 30 with respect to the base member 20. The cylindrical rib 32C may also provide support for the carrier 30 to maintain a small gap between a surface of the base member 20 and a surface of the carrier 30. Having a small gap between the carrier 30 and the base member 20 may reduce friction between the base member 20 and the carrier 30 when the carrier 30 is rotated with respect to the base member 20.

As shown in FIG. 8, a second plate 31A is formed substantially perpendicular to a side of the carrier 30. The second plate 31A is arranged such that at least one edge is formed continuous with a side of the carrier 30. The second plate 31A is positioned a selected distance above the first plate (32A in FIG. 10). This arrangement allows for a two point rotational engagement with the pivotal member 21 when the carrier 30 is mounted on the base member 20. The two point engagement may, advantageously, provide a more stabilized rotational connection between the pivotal member 21 and the carrier 30 (compared to a single plate mounting mechanism). However, the invention is not intended to be limited in scope by this configuration. In other embodiments, the mounting mechanism 31 may be any mechanism or device that enables rotational coupling to the pivotal member 21. Also, in other embodiments, the mounting mechanism 31 may permanently or releasably attached to the carrier 30 and/or the pivotal member 21.

Referring to FIG. 7, in one or more embodiments, the base member 20 also comprises a guide mechanism 22. The guide mechanism 22 is adapted to guide the rotational movement of the carrier 30 with respect to the base member 20. In the exemplary embodiment shown, the guide mechanism 22 comprises an arc-shaped track formed in the base member 20. The arc-shaped track is formed concentric with the pivotal member 21. This guide mechanism 22 is shown in further detail in FIG. 9 (top view) and FIG. 11 (bottom view).

As shown in FIG. 9, the arc-shaped track comprises a recessed groove in a top surface of the base member 20. When the carrier 30 is mounted on the base member 20 and rotated between a first position and a second position, an engaging mechanism (32 in FIGS. 10) on the bottom 38 of the carrier 30 moves in sliding engagement along the path defined by the guide mechanism 22.

For the embodiment shown, a first position of the carrier 30 corresponds to an installed position in the electronic system enclosure 10. As shown in FIG. 3, in the installed position, a long axis LA of the carrier 30 is substantially parallel to the front 18 of the electronic system enclosure 10. The second position of the carrier 30 corresponds to an open (or extended) position with respect to the electronic system enclosure 10. As shown in FIG. 5, in the open position, a long axis LA of the carrier 30 is substantially perpendicular to the front 18 of the electronic system enclosure 10. Engagement of the engaging mechanism (32 in FIG. 10) and the guide mechanism 22 between the first position and the second position provides the guided rotational motion of the carrier 30 with respect to the base member 20.

Referring back to FIG. 7, in one or more embodiments, the base member 20 also comprises at least one positioning mechanism 23. The at least one positioning mechanism 23 is disposed on the base member 20 to enable the selected positioning of the carrier 30 at one or more selected angular positions with respect to the base member 20. The at least one positioning mechanism 23 may also be adapted to releasably lock the carrier 30 at the one or more selected angular position with respect to the base member 20 (as further described below).

In the exemplary embodiment shown, the at least one positioning mechanism 23 comprises a plurality of positioning mechanisms 23. Each of the positioning mechanisms 23 comprises an opening formed at a selected angular position along the guide mechanism 22. Each opening is adapted to receive the engaging mechanism 32 therein when the carrier 30 is positioned at the corresponding selected angular position. The exemplary positioning mechanism 23 shown in FIGS. 7 and 10 is shown in further detail in FIGS. 9, 11, and 12. The openings in the exemplary embodiment comprise semi-circular domed shaped holes or cavities that correspond in shape and orientation to the engaging mechanism 32 of the carrier 30.

As stated above, the carrier 30 includes an engaging mechanism (32 in FIG. 10). The engaging mechanism (32 in FIG. 10) is adapted to travel along the guide mechanism 22 of the base member 20 as the carrier 30 is moved from an installed position to an open position with respect to the base member 20. As shown in FIG. 9, in one or more embodiments, a stop mechanism 26 is provided proximal the end of the guide mechanism 22 corresponding to the location of the engaging mechanism (32 in FIG. 10) when the carrier 30 is in the installed position. In the embodiment shown, the stop mechanism 26 comprises a shoulder formed at the end of the guide mechanism 22. The stop mechanism 26 provides a positive stop for the engaging mechanism 32 when in the installed position (shown in FIG. 3). The stop mechanism 26 restricts further rotational movement of the carrier 30 into the electronic system enclosure 10.

In one or more embodiments, a stop mechanism 24 is also provided at the other end of the guide mechanism 22. The stop mechanism 24 comprises a positive stop shoulder disposed along an edge of the base member 20 at a location corresponding to the location of the engaging mechanism 32 when the carrier 30 is in the open position (shown in FIG. 5). The stop mechanism 24 provides a positive stop for the engaging mechanism (32 in FIG. 10) when the carrier 30 is moved to the open position. The stop mechanism 24 restricts further rotational movement of the carrier 30 out of the electronic system enclosure 10. In other embodiments, the positive stop mechanism 24 may be any mechanism or device capable of preventing rotation of the carrier 30 beyond the installed position.

As shown in FIG. 10, in one or more embodiments, the engaging mechanism 32 comprises a semi-circular dome shaped protrusion. The engaging mechanism 32 and the positioning mechanisms 23 are complementary in shape. The engaging mechanism 32 is disposed on the bottom 38 of the carrier 30. The engaging mechanism 32 is also adapted to engage with the positioning mechanisms 23 disposed on the base member 20 when the carrier is moved to a selected angular position. A more detailed view of the engaging mechanism 32 is shown in FIG. 13.

Figure 13:
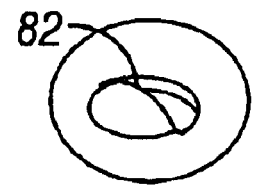
FIG. 13 is an enlarged partial view of the engaging mechanism of the carrier shown in FIG. 11.

Referring to FIGS. 10 and 13, in one or more embodiments, the engaging mechanism 32 is oriented so that the rounded dome side faces towards the back of the electronic system enclosure 10 and the protruding edge faces towards the front 18 when the carrier 30 is in the open position. The positioning mechanisms 23 are arranged along the guide mechanism 22 to correspond in orientation to the engaging mechanism 32 when the carrier 30 is positioned at the corresponding selected angular position with respect to the base member 20. This arrangement and orientation provides an engaging mechanism 32 that releasably locks with the positioning mechanisms 23 when the carrier 30 is rotated in a selected direction.

In the exemplary embodiment shown, the selected direction is the direction of rotation from the installed position to the open position. When the carrier 30 is rotated from the installed position to the open position, the protruding edge of the engaging mechanism 23 will engage a complementary edge of a positioning mechanism 23 and releasably lock the engaging mechanism 32 in the positioning mechanism 23. The engagement between the engaging mechanism 32 and a positioning mechanism 23 may be released or avoided by lifting up the carrier 30 as the carrier 30 is moved to the open position. When the carrier 30 is rotated back to the installed position, the rounded dome shaped side of the engaging mechanism 32 will engage with complementary sides of the positioning mechanisms 23. Because the engaging sides in this direction are sloped surfaces, the engaging mechanism 32 will slide relative to the positioning mechanism 23, and the carrier 30 will be permitted to move more freely back to the installed position. In another embodiment, the positioning mechanisms 23 and the engaging mechanism 32 may be configured to engage in releasable locking engagement in both directions.

In one or more embodiments, the positioning mechanism 23 corresponding in location to the location of engaging mechanism 32 in the installed position may be adapted to function as a mechanism that releasably locks the carrier 30 when positioned in the installed position. Similarly, in one or more embodiments, the positioning mechanism 23 corresponding in location to the location of the engaging mechanism 32 in the open position may be adapted to function as a mechanism that releasably locks the carrier 30 when in the opened position. In other embodiments, other mechanisms or devices may be used to position and/or releasably lock the carrier 30 with the base member 20 when in the open position and/or the installed position.

The carrier 30 is adapted to attach to at least one peripheral device 40, as shown for example in FIG. 6. The at least one peripheral device 40 may comprise a smart card reader, a hard disk drive, a tape drive, a CD ROM drive, a DVD ROM drive, or a CD or DVD R/W (Read/Write) drive. The type of peripheral device 40 is not intended to limit the scope of the invention. In the exemplary embodiment shown, the at least one peripheral device 40 is a hard disk drive. In one or more embodiments, a plurality of peripheral devices (not shown) may be attached to the carrier 30.

In one or more embodiments, the carrier 30 also includes a plurality of guide rails 34. The number of sets of guide rails 34 typically corresponds to the number of peripheral devices attachable to the carrier 30. In the embodiment shown in FIG. 5, the carrier 30 includes three sets of guide rails 34. As illustrated in FIG. 6, the guide rails 34 serve as structural supports for attaching the at least one peripheral device 40 to the carrier 30. The guide rails 34, preferably, releasably attach to the peripheral device 40. Sliding mechanisms (not shown) may be attached to the peripheral device 40 to permit the peripheral device 40 to slide in and out of the carrier 30 so that it is easily accessible and/or removable. The guide rails 34 may be designed so that the peripheral device 40 couples to the guide rails 34 without mechanical fasteners such as screws or bolts. For example, the peripheral device 40 may be removably attached to the guide rails 34 with quick-release fasteners such as spring connectors. If the peripheral device 40 is coupled with quick-release fasteners, removal and reinstallation of the peripheral device 40 is simplified. However, the use of any type of mechanical fastener is acceptable and is within the scope of the invention.

As shown in FIG. 4, the electronic system enclosure 10 also includes stiffeners 14, 17 that provide structural support for the electronic system enclosure 10. The stiffeners 14, 17 typically include stiffener air vents 15 that may be formed in the stiffener 14 and located proximate the carrier 30. The carrier also includes air vents 35. The air vents 15, 35 permit air to circulate proximate the peripheral devices (40 in FIG. 6). Air circulation acts to cool the peripheral devices (40 in FIG. 6) and prevents temperatures in the electronic system enclosure 10 from rising above acceptable levels. Moreover, the carrier air vents 35 and the stiffener air vents 15 provide openings for a forced circulation system. For example, cooling fans (not shown) may be included in the peripheral device storage system to further control temperatures.

Referring to FIG. 6, in one or more embodiments, the carrier 22 also includes a back plane 37. The back plane 37 may include electronic connectors (not shown) that mate with corresponding electronic connectors (not shown) on the at least one peripheral device 40. The electronic connectors provide power to the peripheral device 40 through a connection with a power supply (not shown) and enable the peripheral device 40 to transmit information to and from other computer hardware (not shown). The back plane 37 may also include an electromagnetic interference ("EMI") ground to prevent the peripheral device 40 from being damaged by electromagnetic energy.

The carrier 30 may also include a plurality of pads (not shown) that are either permanently or releasably attached to a bottom of the carrier 30 to serve as a "gap filler" between the bottom 38 of the carrier 30 and a surface of the base member 20. The pads (not shown) may serve as structural supports by transferring the weight of the carrier 30 and the peripheral devices 40 to the base member 20. In one or more embodiments, the load transfer is desirable to prevent the weight of the carrier 30 and the peripheral devices 40 from being disproportionally supported by the a ribbed member or other spacer provided between the bottom 38 of the carrier 30 and a surface of the base member 20. The pads (not shown) may also serve as shock absorbers that absorb vibrations during shipment and operation. The pads (not shown) may also accommodate tolerance stack-up in manufacturing, thereby easing manufacturing requirements and reducing the cost of the peripheral device storage system. The pads are not intended to limit the scope of the invention. Furthermore, other embodiments of the invention may include additional structural supports.

The rotatable storage system may also include a security device that prevents rotation of the carrier 30 when the security device is activated. For example, the rotatable storage system may further include a locking mechanism, such as a latch (not shown) adapted to couple the carrier 30 to the base member 20 or to the enclosure 10 when the carrier 30 is in the installed position. The locking mechanism may be adapted to automatically activate when the carrier 30 is moved to the installed position. An automatically actuated locking mechanism may be adapted to only deactivate upon use of a deactivation device. For example, the deactivation device may comprise a button adapted to deactivate the locking mechanism upon compression of the button. Alternatively, the deactivation device may comprise an electronic signal that deactivates the locking mechanism. Any releasable locking mechanism may be used with one or more embodiments of the invention. In one embodiment, the engagement mechanism 32 and a positioning mechanism 23 may be adapted to engage in locking engagement when the carrier 30 is moved into the installed position and only disengage under a selected deactivation criteria.

The accompanying figures are intended to generally illustrate aspects of a peripheral device storage system in accordance with an embodiment of the invention. While the figures show a detailed illustration of only a single rotatable peripheral device storage system within an electronic system enclosure 10, in other embodiments a plurality of rotatable peripheral device storage systems may be mounted within the electronic system enclosure 10. The figures are provided to clarify aspects of embodiments of the invention and are not intended to limit the scope of the invention.

Additionally, the components of the rotational storage system may be of a different size and/or shape than shown for the exemplary embodiments. For example, the peripheral device storage system may be adjusted to accommodate different types of peripheral devices. Further, the electronic system enclosure 10 may be larger or may contain a plurality of shelves to contain the peripheral device storage systems.

Further, the other structural components of the rotational storage system may be made of different materials. For example, the base member 20 and carrier 30 may comprise metal, plastic, composite, or any combination thereof. The material composition of the elements of the rotational storage system are not intended to limit the scope of the invention.

In one or more embodiments, the invention may provide a simple space-maximizing mechanism by which peripheral devices may be easily accessed and removed for service, replacement, or repair. In one or more embodiments, the invention may also provide rotational peripheral device carriers, which allow a large number of peripheral devices to be stored in a comparatively small amount of space. The use of less space may optimize the storage capacity of the computer system while minimizing system space. For example, a plurality of base members 20 having carriers 30 rotatably attached thereto may be positioned in the electronic system enclosure 10. In one or more embodiments, having the long axis LA parallel to the front 18 of the electronic system enclosure 10 may reduce the amount of office or storage space required for the peripheral device storage system.

In one or more embodiments, an operator may, advantageously, install or swap the peripheral devices as needed without requiring removal of the access cover (not shown). This may be especially advantageous for applications such as "hot-swapping" where peripheral devices may be added to or removed from the computer system while the system is still running.

In one or more embodiments, the invention may also provide a peripheral device carrier that can be swung out toward an operator and can be stopped at any desired angles so an operator can install or swap the peripheral devices as needed without any mechanical fasteners. The peripheral device carrier may, advantageously, include a positive stop and/or a positive locking mechanism that allows the carrier to be stopped and/or locked at one or more selected angular positions during servicing.

In one or more embodiments, the invention may also provide a peripheral storage device that can be used as a security storage device with limited access for only service personnel. In one or more embodiments, peripheral storage device is adapted such that the peripheral devices contained in the peripheral storage device are not exposed to an outside of an enclosure when in the installed position. In one or more embodiments, the peripheral storage device is adapted to contain one or more peripheral devices such that their containment in an enclosure is not readily noticeable from an outside of the enclosure when in the installed position. Storing peripheral devices in a storage system such that they are not readily noticeably from an outside of the enclosure may, advantageously, minimize the possibility of the peripheral devices being handled, serviced, or removed by unauthorized personal.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for storing electronic devices, comprising:
   a base member attachable to an enclosure, the base member comprising a pivotal member, wherein the pivotal member comprises a cylindrical body extending in a substantially perpendicular direction from the base member; and
   a carrier rotatably coupled to the base member; the carrier comprising a mounting mechanism rotatably coupled to the pivotal member to facilitate rotational movement of the carrier with respect to the base member, the carrier adapted to attach to at least one peripheral device,
   wherein the mounting mechanism comprises a plurality of parallel plates having openings in alignment with one another for receiving the pivotal member therein, and wherein at least one of the parallel plates comprises a cylindrical rib that extends around at least one of the openings.

2. The apparatus of claim 1, wherein the mounting mechanism has an opening for receiving the pivotal member therein.

3. The apparatus of claim 1, wherein the base member further comprises a guide mechanism to guide rotational movement of the carrier with respect to the base member.

4. The apparatus of claim 3, wherein the guide mechanism comprises an arc-shaped track formed in the base member.

5. The apparatus of claim 3, wherein the carrier further comprises an engaging mechanism adapted to engage with the arc shaped track as the carrier moves from a first position to a second position with respect to the base member.

6. The apparatus of claim 1, wherein the carrier further comprises an engaging mechanism adapted to engage with the base member to guide the rotational movement of the carrier as the carrier rotates with respect to the base member.

7. The apparatus of claim 1, wherein the base member further comprises at least one positioning mechanism to enable selected positioning of the carrier with respect to the base member at at least one select angular interval.

8. The apparatus of claim 7, wherein the carrier further comprises an engaging mechanism adapted to engage with the at least one positioning mechanism.

9. The apparatus of claim 8, wherein the engaging mechanism is adapted to releasably lock with the at least one positioning mechanism when the carrier is moved in a selected direction with respect to the base member.

10. The apparatus of claim 9, wherein the engaging mechanism comprises a semi-circular dome shaped protrusion and the positioning mechanism comprises a semi-circular dome shaped hole, and the protrusion and the hole are arranged to engage in releasable locking engagement when the carrier is moved from an installed position to an open position with respect to the base member.

11. The apparatus of claim 7, wherein the positioning mechanism is adapted to releasably lock with the carrier at the selected angular intervals when the carrier is moved in a selected direction with respect to the base member.

12. The apparatus of claim 7, wherein the at least one positioning mechanism comprises an opening in said base member.

13. The apparatus of claim 7, wherein the at least one positioning mechanism comprises a plurality of positioning mechanisms.

14. The apparatus of claim 1, wherein the carrier further comprises an engaging mechanism disposed on the carrier and adapted to enable selective positioning of the carrier with respect to the base member at select angular intervals.

15. The apparatus of claim 1, wherein the carrier is rotatable from an installed position to an open position.

16. The apparatus of claim 15, wherein the base member further comprises at least one positive stop mechanism to stop the rotational movement of the carrier with respect to the base member at at least one of the open position and the installed position.

17. The apparatus of claim 1, further comprising the at least one peripheral device attached to the carrier.

18. The apparatus of claim 17, wherein the carrier further comprises guide rails, and the at least one peripheral device is releasably attached to the guide rails.

19. The apparatus of claim 18, wherein the at least one peripheral device has at least one sliding mechanism attached thereto, and the at least one sliding mechanism is releasably attached to the guide rails.

20. The apparatus of claim 17, wherein a plurality of peripheral devices is releasably attached to the carrier.

21. The apparatus of claim 1, further comprising the enclosure, wherein the base member is attached to the enclosure.

22. The apparatus of claim 21, wherein the base member is arranged inside the enclosure, proximal an opening of the enclosure, such that the carrier is rotatable in and out of the enclosure.

23. The apparatus of claim 21, further comprising a plurality of base members attached to the enclosure and a plurality of carriers, each carrier rotatably attached to a corresponding base member.

24. The apparatus of claim 1, further comprising a security device that prevents rotation of the carrier when the security device is activated.

25. The apparatus of claim 1, wherein the base member comprises a base plate.

26. An apparatus for storing electronic devices, comprising:
   an enclosing means for enclosing the electronic devices;
   a storage means for releasably coupling to at least one of the electronic devices; and
   a coupling means attached to the enclosing means for rotationally coupling the storage means to the enclosing means; the coupling means comprising a pivoting means for enabling pivotal rotation of the storage means with respect to the coupling means, the storage means comprising a mounting means for coupling the storage means to the pivoting means, the coupling of the mounting means to the pivoting means enabling the rotational movement of the storage means with respect to the coupling means,
   wherein the pivoting means comprising first cylindrical means for enabling the coupling of the storage means to the pivoting means, and wherein the mounting means comprises a plurality of plate means having aligned openings for receiving the pivoting means, the aligned openings comprising rib means having second cylindrical means for supporting and stabilizing the rotational coupling of the storage means to the enclosing means.

27. The apparatus of claim 26, wherein the coupling means further comprises a guidance mechanism for guiding the rotational movement of the storage means with respect to the enclosing means.

28. The apparatus of claim 26, wherein the coupling means further comprises a positioning means for securing the storage means at selected angular positions with respect to the enclosing means.

29. The apparatus of claim 26, wherein the at least one of the electronic devices comprises a peripheral device.

30. A method for storing electronic devices in an enclosure, comprising:

attaching a base member having a pivotal member disposed thereon to the enclosure proximal an opening of the enclosure, the pivotal member comprising a cylindrical body extending in a substantially perpendicular direction from the base member;

rotatably mounting a carrier adapted to attach to at least one peripheral device to the base member by coupling a mounting mechanism of the carrier to the pivotal member, the mounting mechanism comprising a plurality of parallel plates having openings in alignment with one another for receiving the pivotal member therein, at least one of the parallel plates comprising a cylindrical rib that extends around at least one of the openings;

releasably attaching at least one peripheral device to the carrier; and rotating the carrier to an installed position in the enclosure.

31. A method for storing electronic devices in an enclosure, comprising:

rotating a carrier pivotally coupled to an enclosure to an open position accessible from an outside of the enclosure, the carrier being pivotally coupled to the enclosure by a base plate having a pivotal member coupled to a mounting member of the carrier, the pivotal member comprising a cylindrical body extending in a substantially perpendicular direction from the base plate, the mounting member comprising a plurality of parallel plates having openings in alignment with one another for receiving the pivotal member therein, at least one of the parallel elates comprising a cylindrical rib that extends around at least one of the openings;

releasably attaching at least one peripheral device to the carrier; and rotating the carrier to an installed position inside of the enclosure.

* * * * *

UNITED STATES PATENT AND TRADEMARK OFFICE
CERTIFICATE OF CORRECTION

PATENT NO. : 6,781,841 B2
DATED : August 24, 2004
INVENTOR(S) : David K.J. Kim et al.

It is certified that error appears in the above-identified patent and that said Letters Patent is hereby corrected as shown below:

Column 12,
Line 15, please replace "elates" with -- plates --.

Signed and Sealed this

Fourth Day of January, 2005

JON W. DUDAS
*Director of the United States Patent and Trademark Office*